Jan. 24, 1961 H. W. CHAPMAN ET AL 2,969,023
FREIGHT LOADING APPARATUS
Original Filed Feb. 23, 1955 5 Sheets-Sheet 1
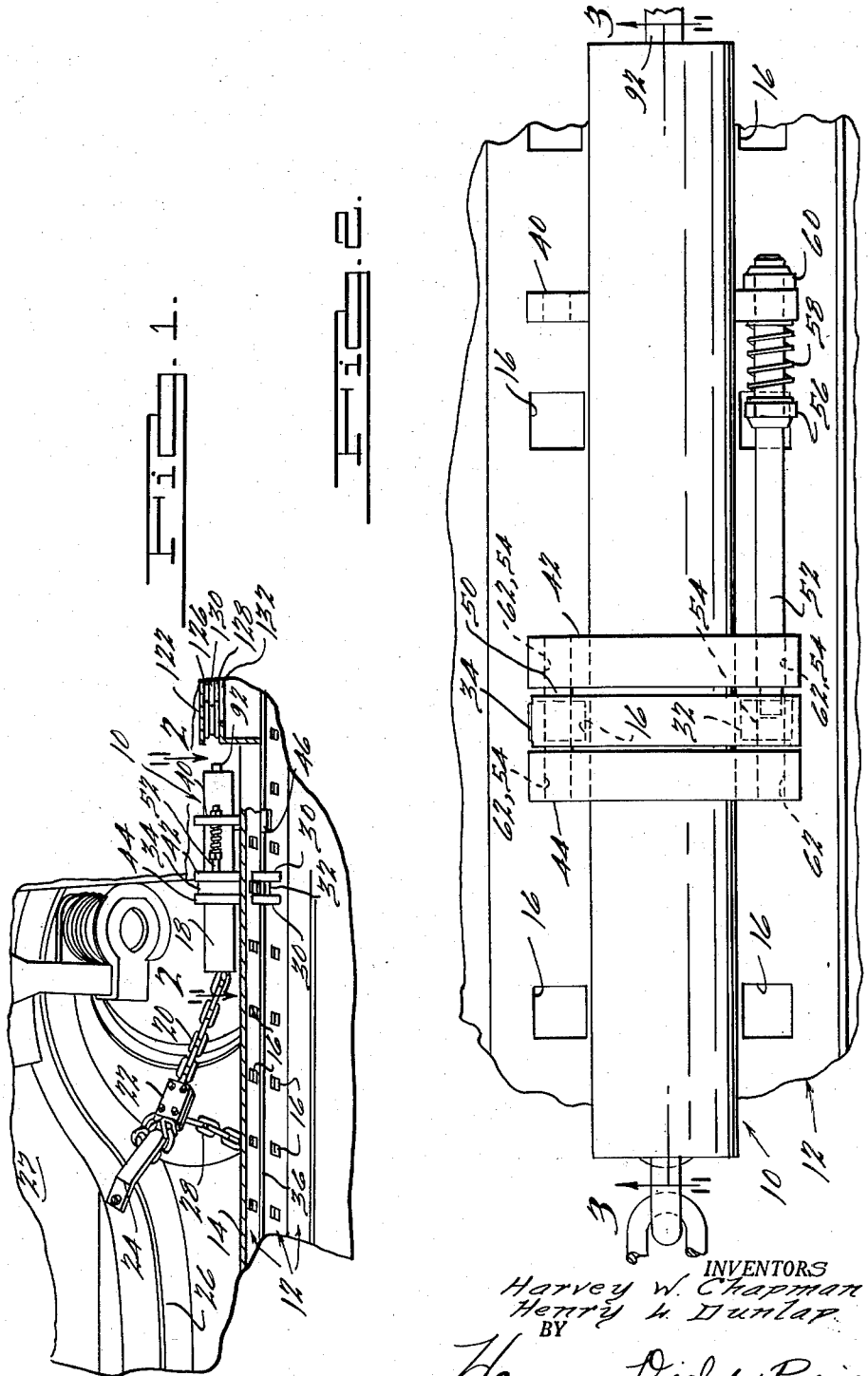
INVENTORS
Harvey W. Chapman
Henry L. Dunlap
BY
Harness, Dickey & Pierce
ATTORNEYS

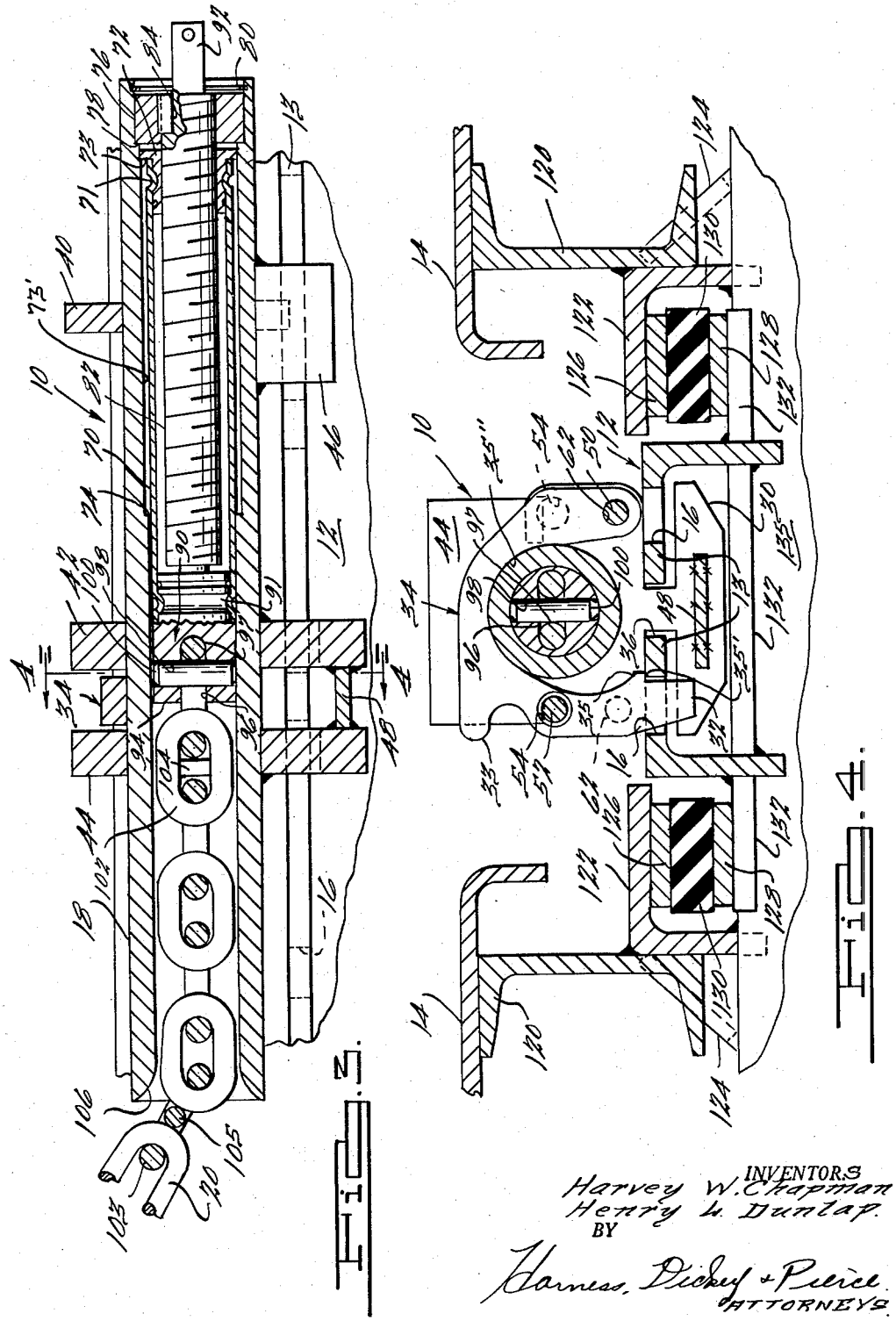

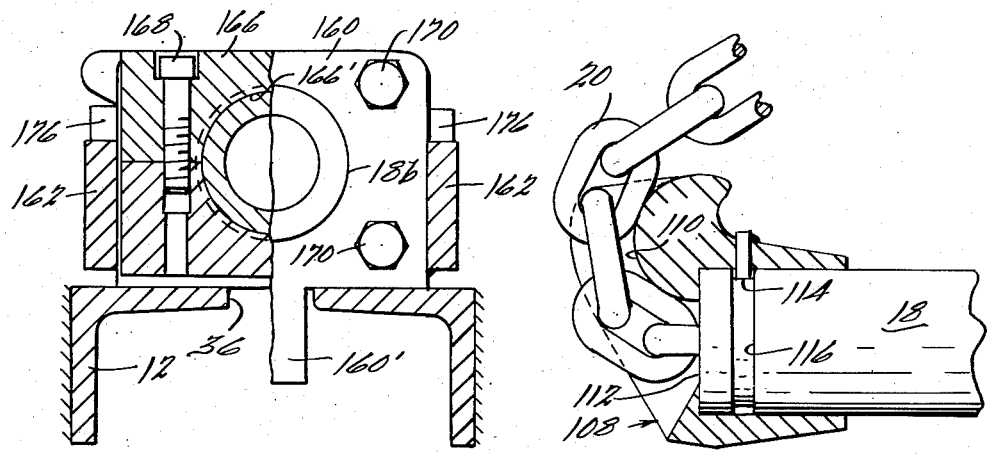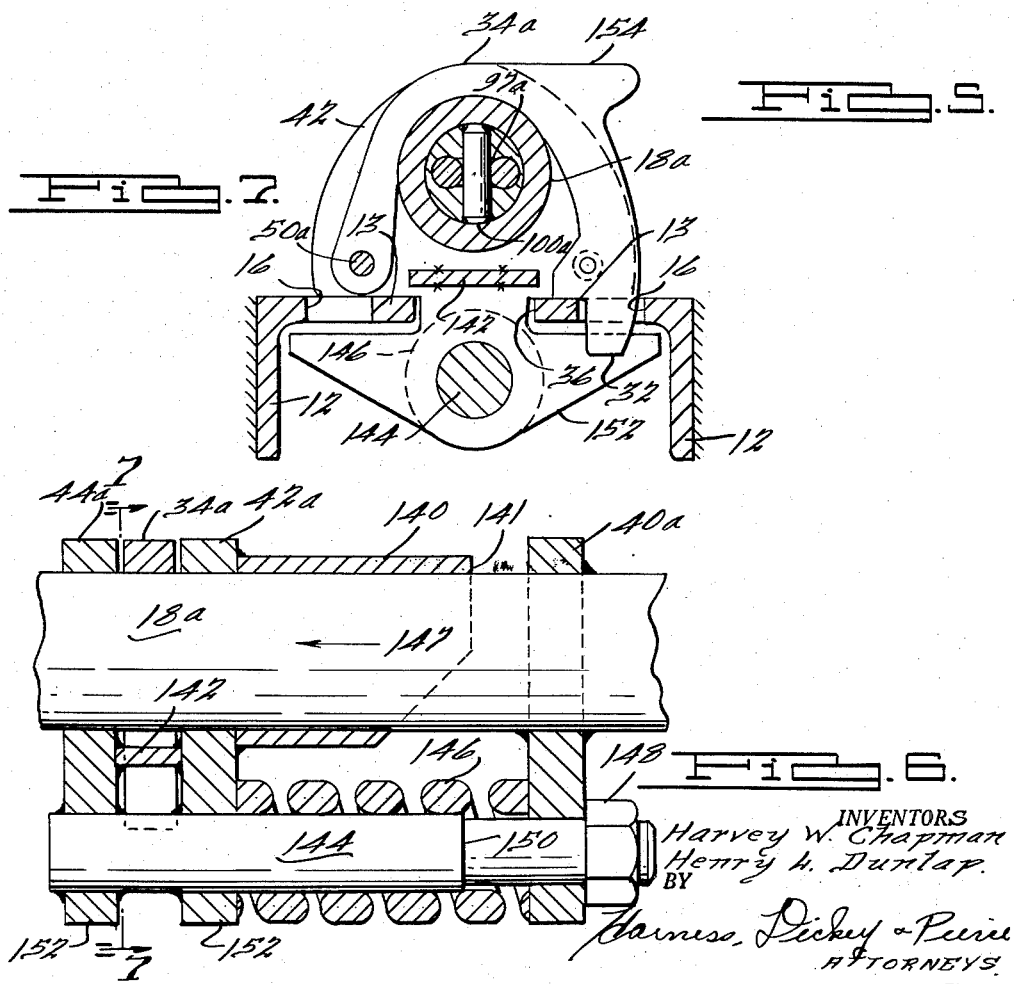

Jan. 24, 1961 H. W. CHAPMAN ET AL 2,969,023
FREIGHT LOADING APPARATUS
Original Filed Feb. 23, 1955 5 Sheets-Sheet 4
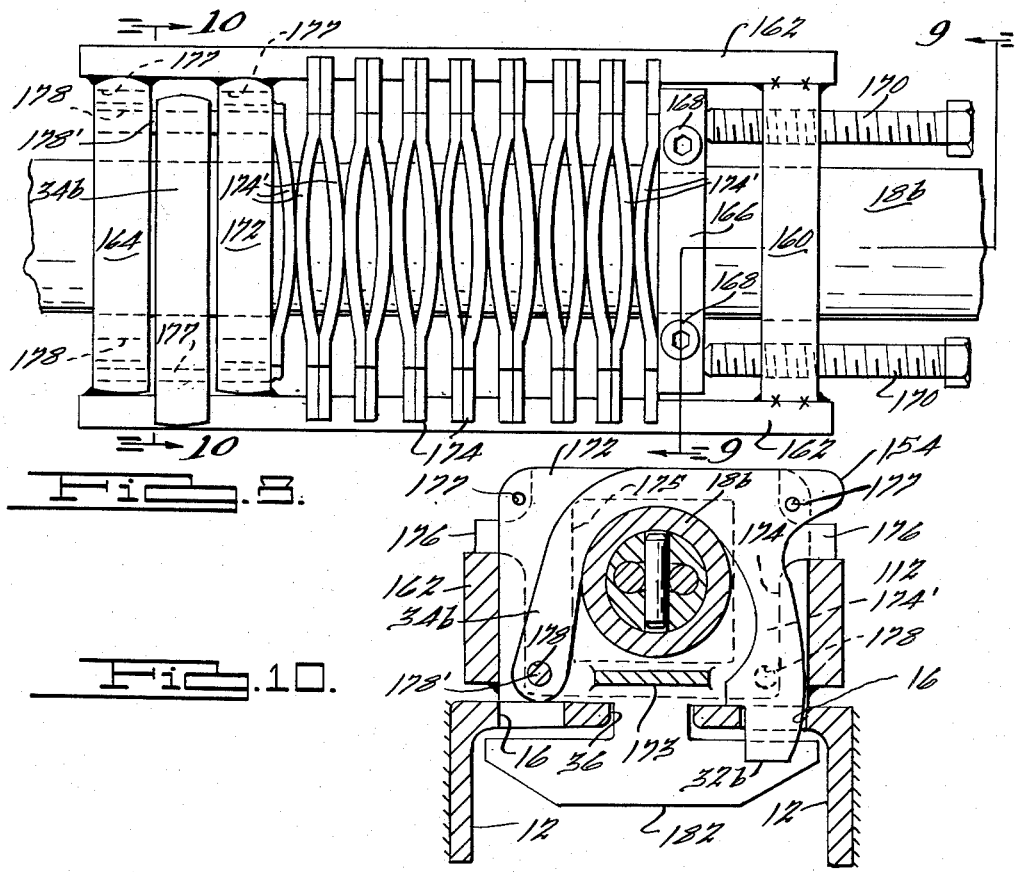
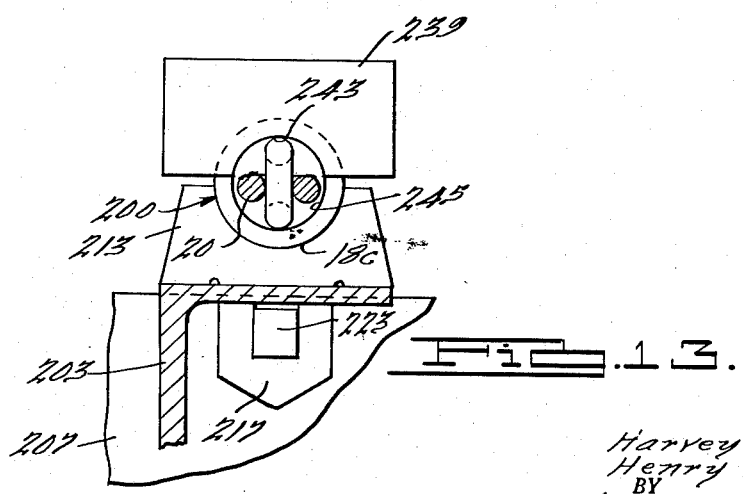
INVENTORS
Harvey W. Chapman
Henry H. Dunlap
BY
Harness, Dickey & Pierce
ATTORNEYS

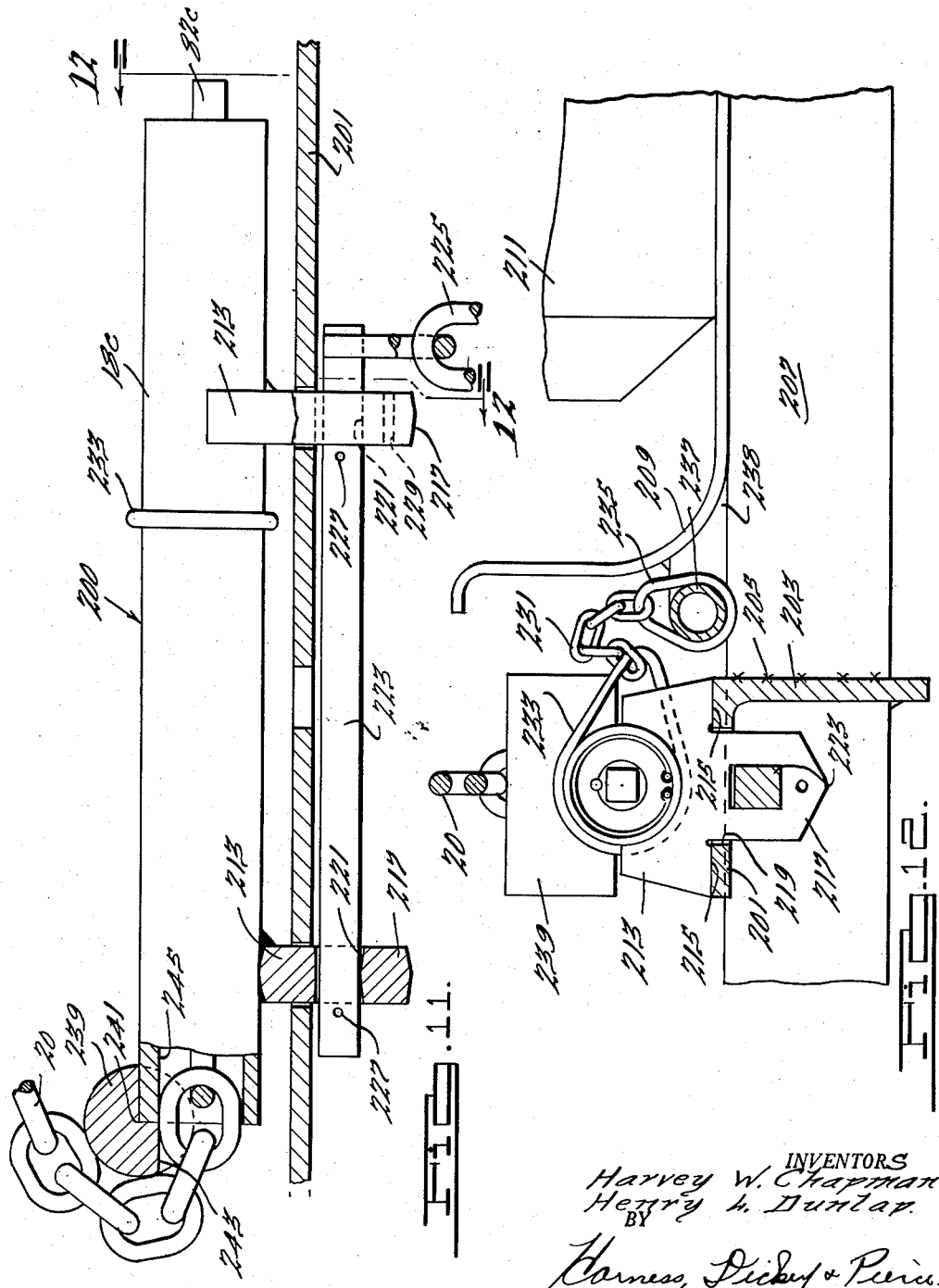

United States Patent Office 2,969,023
Patented Jan. 24, 1961

2,969,023

FREIGHT LOADING APPARATUS

Harvey W. Chapman, Detroit, and Henry L. Dunlap, Dearborn, Mich., assignors to Evans Products Company, Plymouth, Mich., a corporation of Delaware Continuation of application Ser. No. 490,051, Feb. 23, 1955. This application Dec. 17, 1958, Ser. No. 781,114

6 Claims. (Cl. 105—368)

The present invention relates generally to freight loading apparatus. More specifically, the present invention relates to a freight car or auto haul-away trailer or the like adapted to carry vehicles and to novel tie-down or anchoring devices for use on such a freight car or trailer.

In the past in shipping vehicles such as automobiles, trucks, tractors, buses, tanks, etc., on railway cars, trucks, boats, etc., anchoring means have been employed which consisted of means in the automobile through which a chain is passed and chain slack take-up devices along with means to anchor the chain to the deck or frame of the freight car, truck, etc. In some cases these chains have included turnbuckles, which may or may not have been spring loaded, for taking up slack in the tie-down chain once the clamps and chains have been mounted in position. In freight cars, particularly, the shock of coupling and uncoupling the cars is so severe, frequently amounting to as much as 25 to 30 "G's," that even heavy chains, clamps, or turnbuckles are apt to snap and damage may be done to the vehicles being shipped. Furthermore, with the low-slung modern automobile, it has become increasingly difficult to fasten a chain to its frame and obtain a proper vertical disposition of the chain length to prevent undue bouncing of the anchored auto on its springs. As a result, the automobiles are likely to be damaged by bouncing so high as to collide with an overhead member. In most cases, also, the modern auto is so low to the ground as to make it difficult to maneuver chains, clamps, turnbuckles, etc., from a position alongside in order to get the leverage necessary to take up chain slack. Moreover, the usual spring-loaded turnbuckle for this type of usage is too long to be incorporated in the short length of tie-down chain used with low-slung autos.

It is an object of this invention, therefore, to provide freight loading apparatus having a more convenient, more easily adjustable freight or vehicle tie-down means.

It is also an object of this invention to provide a tie-down means having incorporated therein shock absorbing qualities.

Another object is to provide a freight car adapted to haul a plurality of vehicles and having a tie-down device readily adjustable over substantially the full length of its vehicle-supporting surface or surfaces so that many various types of vehicles can be shipped and the tie-down devices still readily accessible beyond the ends of the vehicles.

Still another object is to provide a freight car or truck of the type described having a tie-down device which is slidable substantially the entire length of its vehicle decks, which can be locked in a plurality of positions thereon, and which utilizes adjustable tie-down fittings which include means for tensioning the tie-down lines, cables or chains after being placed in the most advantageous locked position with respect to a vehicle on the deck surface.

More specifically, it is an object of the present invention to provide an improved tie-down device including a fitting which may be selectively secured in a plurality of positions longitudinally of a vehicle supporting deck to provide a coarse adjustment and which is held substantially parallel to the deck and houses fine take-up means for tensioning a flexible tie-down element extending upwardly therefrom and connected to the vehicle thereby eliminating the need for turnbuckles or other fine take-up means in the chain or other flexible tie-down element and enabling the user to tie the vehicle down with the flexible tie-down element extending at any desired inclination even though there is very litle clearance between the deck and tie-down bracket or other point of attachment of the flexible element to the vehicle.

Yet another object is to provide a freight car of the type described having a tie-down track recessed in its deck surface to make possible the use of longer, more nearly vertically-disposed tie-down chains which increases the vertical component of load and decreases the horizontal component of load on the vehicle and thus takes advantage of the shock-absorbing structure of the vehicle itself, i.e., springs, shock absorbers, tires. The recess also permits the tie-down to be covered over to obtain a flush, flat surface for shipping freight other than vehicles.

A yet further object is to provide a tie-down fitting incorporating a simple means to lock or position it in holes in a guide track or co-operating structure and a latching device to prevent disengagement of the locking means.

Other objects and advantages of the present invention will be apparent, or will become apparent, in the following more detailed description taken in conjunction with the accompanying drawings, in which:

Figure 1 is a fragmentary perspective view from below and at an angle, with portions broken away and in section, of a railway car showing a vehicle such as an automobile on a vehicle-supporting deck or surface of the car, and showing the disposition of a pair of guide tracks below the deck surface and a tie-down fitting properly positioned therein with respect to the farme of the automobile;

Fig. 2 is a plan view of the tie-down fitting of Fig. 1, the view being taken generally along the lines 2—2 of Fig. 1;

Fig. 3 is a longitudinal, vertical section through the tie-down fitting of Figs. 1 and 2, the section being taken along the line 3—3 of Fig. 2;

Fig. 4 is a fragmentary vertical sectional view transversely through the deck surface, guide tracks and fitting showing the recessed guide tracks for the tie-down fitting of Figs. 2 and 3 and the resilient mounting thereof, the section being taken along the line 4—4 of Fig. 3;

Fig. 5 is a plan view partly in section showing a smooth surfaced chain guide or "nose" fitting fitted over the end of the outer casing of the tie-down fitting;

Fig. 6 is a fragmentary vertical section, similar to Fig. 3, taken longitudinally through a second modification of the tie-down fitting of this invention, this figure showing a tie-down fitting incorporating a shock absorbing spring mounted under the cylindrical casing;

Fig. 7 is a fragmentary transverse sectional view through the deck and fitting of Fig. 6 showing in particular the mounting of the shock absorbing spring and the details of the clamp bar, the section being taken generally along the line 7—7 of Fig. 6;

Fig. 8 is a fragmentary plan view of still another embodiment of a tie-down fitting embodying a shock absorbing spring, in this case a variable-rate, leaf-type spring located around the outer casing of the fitting;

Fig. 9 is an end view of the fitting of Fig. 8, partially in section, the view being taken along the line 9—9 of Fig. 8;

Fig. 10 is a transverse sectional view of the fitting and guide tracks of Fig. 8 showing the disposition of the leaf spring, the section being taken along the line 10—10 of Fig. 8;

Fig. 11 is a fragmentary end view of still another embodiment of the tie-down fitting of this invention, in this case the fitting being designed for mounting on the sides of a tread-like upper deck ramp member;

Fig. 12 is a side view of the fitting of Fig. 11 as taken on line 12—12 of Fig. 11 with portions broken away and in section, showing the disposition of the member on the side of the ramp member and the details of its latching mechanism; and Fig. 13 is a front view of the tie-down fitting of Figs. 11 and 12.

The invention is illustrated herein in connection with a railway car adapted to carry six automobiles and formed from a suitable superstructure mounted on a flat car, all as fully described and claimed in a co-pending application, Serial No. 487,518, filed February 11, 1955, now Patent No. 2,929,339 dated March 22, 1960 of George Schueder et al., and assigned to the assignee hereof.

The accompanying drawings, and specifically Figs. 1 and 4 thereof, show a tie-down fitting 10 of this invention secured in a slot between a pair of support rails or tracks 12 which may be recessed in a trough-like opening in the vehicle-supporting deck or surface 14. If desired, a pair of such guide tracks can be disposed adjacent the auto wheel tracks on each side of the deck to be adjacent the auto frame members to which the tie-down chain is secured. The guide tracks 12 may be fixed directly to the rail car frame, to the wheel tracks, or may be resiliently mounted as shown in Fig. 4. The rails 12 are provided with a plurality of spaced lock apertures 16 along their top horizontal flanges, in any of which apertures the fitting 10 may be secured. The lock holes 16 are spaced at a convenient coarse adjustment distance, for example 4" to 6". The tie-down fitting 10 can then be laid on the horizontal guide track flanges and slid into a correct approximate position and then anchored in an adjacent lock hole to provide a coarse take-up adjustment. Fine adjustment and proper tensioning of tie-down lines are obtained by an adjustment in the fitting itself. Extending from within a cylindrical outer casing 18 of the fitting is a flexible tie-down member 20, such as a chain, cable, etc., which is extended upwardly to pass through a U-shaped strap 24, or other tie-down receiving means provided on a frame member 26 of the automobile 27, and thence back to be secured by an adjustable chain clamp 22 of a suitable type such, for example, as grab hook 24 in U.S. Patent No. 2,087,067, with the free end allowed to dangle or be secured to the deck structure. This provides the initial, manual take-up and leaves a certain amount of slack in the chain. The fitting 10 has several T-headed members 30 (Figs. 1 and 4) projecting downwardly from cylinder 18 which fit in a slot 36 between the support rails 12 and underlie the horizontal flanges 13 thereof to hold the fitting 10 against vertical removal from the rails 12. The finger-like end 32 of a transverse lock member 34, pivoted by pin 50 in holes 62 between fixed plates 42 and 44, extends over the top of the casing and projects into one of the holes 16 to prevent sliding of the tie-down 10 in the slot 36 between the guide tracks 12 and lock it in fixed longitudinal position.

The mounting details of the fitting 10 are shown more clearly in Figs. 2 and 3. The outer casing 18 of the fitting is seen to be a hollow, elongated cylinder to which are welded the three vertical transverse plates 40, 42, and 44, the plate 48 acting as brace between 42 and 44. Below plate 40 there is welded to the plate 40 and to casing 18 a short, narrow longitudinal plate of fishtail lug 46 which projects down into and fits the slot 36 between supports 12 to give lateral support and resist sidewise pulls on the tie-down chain 20 on the other end of housing 18. Each of the plates 42, 44 is formed on the bottom to provide one of the T-head members 30 mentioned above which slidably connect the fitting 10 between and to the rails. Thus provided, the entire fitting 10 can slide to and fro in slot 36, the full unobstructed length of the slot 36 in tracks 12. If the tracks 12 are substantially co-extensive with the deck of the car, the fittings can be positioned nearly anywhere along the length of the deck. The T-head members 30 are inserted in slot 36 at the end of the tracks 12 or through suitable openings in the horizontal track surfaces. Each guide rail 12 can be provided with a line of anchor holes 16 so the fittings 10 can be reversed end-for-end, if desired. In any transport vehicle, such as a railroad car, employing these hold-downs, two sets of tracks 12 will be used, one located adjacent the inside of the automobile wheels on each side of the automobile. The fitting 10 is usually arranged so that the latch 34 is operated from the outside, thus hand portion 33 of latch 34 will be on the outboard side. The various parts of the fitting are provided with left and right hand holes so that the manually operated parts can be reversed and put on the outboard side regardless of the disposition of the fitting.

To prevent chance displacement of the finger-end 32 of the latch piece 34 out of a hole 16, a latch pin 52 is provided which slidably extends through and is supported by holes in plates 40 and 42 and its length is such that it projects far enough to engage a hole 54 in the latch piece 34 thus preventing it from pivoting and locking it in latching position. The latch pin 52 is provided with a screw collar 56 against which is seated a compression spring 58 and its outer end is adjustably secured in plate 40 by a nut 60. The extended length of the latch pin 52 and the position of collar 56 is so adjusted that the lever can extend into the latch 34 and the spring 58 will bottom before the reduced end of the latch pin 52 is pulled out of plate 42. Thus provided, the latch pin 52, when passed through hole 54 will hold the clamp-lock bar 34 in the locked position in a hole 16. When the latch pin 52 is withdrawn from hole 54 by grasping it and sliding it to the right, as in Fig. 2, spring 58 is compressed and the latch 34 can be raised out of the hole 16. Then the latch pin 52 can be released to bear against the side of the latch 34 to hold it by friction in any elevated position, this being a convenience in use since it permits the latch to be held in an unlocked position while the fitting 10 is moved in the guide tracks into position. The shoulder 35 on the inside of the latch 34 will abut the bottom of casing 18 to limit upward pivoting and either the bottom edge thereof 35' abuts the top of rail 12 to restrict downward movement into holes 16 or this is done by curved portion 35" abutting the top of casing 18. When the latch finger 32 is dropped down into one of the holes 16 the latch pin 52 will automatically enter the lock hole 54 to lock the bar.

The interior details of the casing 18 and the mounting of the chain 20 therein can be seen most plainly in Fig. 3. It will be evident from the preceding discussion that the casing is secured to the frame, either directly by bolting or welding, or resiliently through rubber or the like. Inside the outer casing 18 is a cylinder or tube-like member 70 that is secured through various parts to chain 20 which will prevent it from rotating substantially. It is rolled at 71 into an annular groove in a nut 72 that has flange end 73 fitted into an enlarged bore 73' of the casing. The nut is fixedly secured to the sleeve 70 as by a cross pin or brazing, etc., so that they will move together as one piece. A shoulder 74 which engages the flange 73 governs the length of leftward movement of the tube 70, as will be more fully described below. In the end of the housing is a collar 76 which is retained on the inner side against a shoulder 78 in casing 18 and on the outer side by a snap-ring 80. Shoulder 78 takes the chain load and transfers it into casing 18. Through the center of the collar 76 there is threaded an adjusting screw 82, the screw being keyed into the collar by a roller key 84 so that the screw 82 and the collar 76 move in the casing as one unit. The adjusting screw 82 threads through the nut 72 so that rotation of the screw moves the nut and sleeve axially. At the other end the tube 70 is rolled into end member 90 at 91 and brazed, cross-pinned or otherwise fixed to it as one piece. Thus arranged, the tube 70 and screw 82 form a sealed, fluid tight unit and when a wrench is placed over the square outer end 92 of the screw 82, the latter may be turned in either direction to advance or retract the tube 70 fore-and-aft of the casing 18. Fig. 3 shows the tube in fully retracted (full take-up) position and the reduced end 82' of screw 82 abuts member 90 with very little friction to provide easy breakaway. The sealed space between the tube and the screw is partially filled (i.e., about ⅓ full) with grease or other lubricant to provide efficient, smooth operation. The advance of the nut 72 along the screw wipes this lubricant on and off of the screw, keeping it always in a well lubricated condition and preventing corrosion, binding, and sticking. In any screw fitting adapted for outdoor use, the weather tends to corrode the screw, making it difficult to operate. The sealed, self-lubricating nature of the screw-tube assembly of this invention makes for easy operation and freedom from sticking and binding despite only intermittent usage. Still another advantage of the tube-screw assembly of this inventoin is the ease of disassembly and servicing. To remove the screw and tube from the outer casing only the snap-ring 80 need be removed to pull screw, tube 70, and chain 20 out of the casing at the right end of Fig. 3.

The member 90 of tube 70 has formed therein a line-securing means such as a chain anchor portion 94. The portion 94 includes a slot 96 shaped to receive an end link 97 of the chain 20 and a vertical hole 98 at about right angles thereto, positioned so that a pin 100 can be freely passed through the link 97 to secure it in the slot. If a cable or other type line were used instead of a chain, a suitable loop could be provided on the end thereof equivalent to chain link 97. The second link 102 of the chain secured to end link 97 and the first link 103 extending out of the casing are each provided with welded-in cross pins 104 and 105, respectively, to serve as signals indicating fully retracted and fully extended positions. When the tube 70 is extended to its limit to the left with the tube flange 72 in contact with shoulder 74, the cross pin 104 of link 102 will be just visible or accessible to the operator and he will know that the sliding tube is fully extended. When the cross pin 105 in link 103 is adjacent the end of the casing he will then know the screw is fully retracted, as shown in Fig. 3. In fully extended position, the cross pin 100 is still within casing 18, but the chain may be disassembled by removing the cylinder unit through the right hand end of the casing 18 and pushing out pin 100.

As shown in Fig. 3 the chain 20 is secured in the anchor portion 94 and extends out through the open end of the casing 18. The outer edge 106 of the casing is rounded to provide clearance to bend the chain and increase the bearing between chain and casing. For situations where the bearing area should be greatly increased and a smooth surface provided to prevent kinking of the chain, especially when the latter is brought back sharply over the end of the casing, the casing 18 can be provided with a "nose" fitting 108 (see Fig. 5) having an enlarged, smoothly rounded surface 110 to better support the chain by bearing against several links. The fitting 108 is fitted over the end 112 of the casing and rotatably secured thereon by a key 114, shown welded in position in the fitting 108 and projecting down into an annular groove 116 in casing 18. Thus provided, the nose fitting 108 can swivel on the casing to bring the surface 110 in correct alignment with the chain.

The guide tracks 12 will be seen in Fig. 4 to be mounted in a trough below the deck surface or plate 14. Channel members 120 as a part of the railroad car frame are on the underside of the surface 14 on each side of the trough. An angle bracket 122 is welded at intervals to each of the channels 120 and braced thereagainst by gusset plates 124. Secured by bolts or the like (not shown) to the underside of each of the angle brackets 122 is a metal strap 126. A second strap 128 is bolted to a lower support plate 132 to which the two guide tracks 12, which are of structural angle iron, are each welded at right angles, as seen in Fig. 4, the tracks 12 being notched out to receive the plates 132. A rubber layer 130 is bonded between and to straps 126 and 128 to yieldably connect the tracks 12 to the car frame members 120 and absorb shock loads. The straps 126 and 128 with rubber 130 in between can be made up as a one-piece, bonded unit. The member 135 visible in Fig. 4 is a car frame member located beyond the shock absorbing mounting and not in actual contact therewith. The tracks 12 are notched out by about an inch wider than the width of member 135, thus restrcting permissible deformation of rubber layer 130 to safe limits.

In Figs. 6 through 10 there are illustrated several embodiments of tie-down fittings which incorporate built-in shock-absorbing elements. The incorporation of a shock absorber in the fitting contributes longer life to the fitting itself and to the guide tracks and their mountings, as pointed out hereinbefore. In the description to follow, the parts will be given the same numerals plus the suffix "a" where they are similar in design and function to those of the preceding figures, it being understood that track rails 12 are preferably rigidly secured as by welding to the railroad car frame or to the wheel tracks or frame for the shipped automobiles. As shown in Fig. 6, the outer casing 18a of the fitting (the interior details of which are the same as in Figs. 2 to 4) is rigidly welded in plate 40a and slidably supported in a sleeve 140 which is welded to plate 42a. Casing 18a is also slidably passed through an aperture in plate 44a. Plates 42a, 44a are secured together by a spacer 142 and by an elongated shock absorber shaft 144 or spring bolt which is passed through the plates 42a, 44a and welded thereto and slidably extended through plate 40a. A heavy compression spring 146 is placed around shaft 144 between plate 42a and plate 40a, the outer end of the shaft 144 being adjustably secured over plate 40a by a nut 148. A shoulder 150 is provided in shaft 144 to limit its travel by bottoming against plate 40a. The end 141 of sleeve 140 will also bottom against 40a to prevent overloading of spring 146. Tightening or loosening of the nut 148 will apply the desired amount of pre-loading on the spring 146. Latch plate 34a, between plates 42a and 44a, locks sleeve 140 to rails 12. Thus, the load applied by the tie-down chain 20 will cause the outer casing 18a to move within sleeve 140 in the direction of the arrow 147 against the action of spring 146. As will appear more clearly in Fig. 7, each of the plates 42a, 44a, has a T-member 152 somewhat similar to that shown in Fig. 4 to fit down between the guide tracks. The latch plate 34a is similar in function and mounting to member 34 shown in Fig. 4 being provided with a projecting finger or knob 154 to provide a convenient finger hold for lifting. Holes 155 will permit the latch 34a to be wired to plates 42a or 44a to prevent inadvertent unlatching.

In Figs. 8 to 10 another shock-absorbing tie-down fitting is shown, in this case a variable-rate (no resonance), leaf type of spring is provided which surrounds the outer casing 18b, similar parts to those already described in connection with the tie-down being given a suffix "b." As shown in Fig. 8, a substantially square frame is provided comprising a transverse plate 160 (with downwardly projecting fishtail lug 160' fitting in slot 36) to which is welded a pair of side-frame members 162. At the opposite end a pair of plates 164 and 172, with plate 173 welded between and to them, are welded between the side members 162 to complete the frame. The spring 174 is confined between plate 172 and a plate 166. The outer casing 18b of the fitting is passed through plates 160, 164 and is free to slide back and forth therein. The plate 166, however, is secured over or around the casing 18b, the plate 166 being split in half and tightly clamped around the casing by several Allen-headed stud bolts or screws 168, and sitting in annular groove 166' in the casing. Four adjusting screws 170 threaded through end plate 160 bear against the split plate 166 to adjust its position relative thereto and apply a pre-loading to the spring 174. The variable-rate, multiple-leaf spring 174 has a rectangular center cutout 175 disposed around the casing 18b and between plates 166 and 172 to resiliently oppose sliding movements of the casing (as viewed in Fig. 8). With the square center opening, the leaf sections 174' are of constant cross-section to give a smooth change of spring rate. As appears more clearly in Fig. 10, the spring 174 has an ear 176 on each side which rests on the top edge of the adjacent side frame member 162. Aligned holes 177 in plates 164, 172, and latch 34b receive a wire or pin to hold latch 34b and its finger 32b in latching position in holes 16. The parts are arranged, as seen in the drawings, to permit reversal thereof, i.e., pivot pin holes 178 for pin 178' and latch holes 177 can be on either side of the casing 18b in plates 164 and 172.

The plates 164 and 172 have bottom T-members 182 (Fig. 10) similar to portions 30 of the preceding embodiments which are fitted in the slot 36 below the horizontal guide track flanges 13, 12. Thus mounted, the spring 174 takes up the shock on the tie-down chains and permits resilient leftward movement of the casing 18b relative to plates 160, 172, and 164. The latch 34b has a projecting nose or finger 154 for a convenient finger hold to lift it free of the hole 16. The tie-down fitting of Figs. 8 to 10 is intended to give a hook-type curve of deflection against load and absorbs load at an increasing, varying rate.

Turning now to Figs. 11-13 for another embodiment of the invention, the casing 18c contains the fine take-up adjustment means operated by screw 82c, that has already been described in connection with Figs. 3 and 4. In this embodiment the tie-down 200 is latched to the horizontal leg 201 of a single right angle track 203 which is suitably supported on the frame, as by welding at 205 to cross members 207. The tie-down 200 does not embody shock absorbing means and if shock absorption is desired it may be incorporated in the chain 20, between the track 203 and the frame (contrary to the rigid connection provided by weld 205), or between the members 207 on which the track 203 and wheel pan 209 are mounted and the ultimate load carrying structure of the railroad car, e.g., the chassis. It may be observed that since the left side of the angle 203 is open the bottom of leg 201 is readily accessible, contrary to the pair-of-angles arrangement shown hereinbefore as the support track for the tie-downs. This open construction lends itself particularly to use on the overhead ramp or upper level of an ordinary auto haulaway or the railroad car shown in the aforementioned copending application of Scheuder et al. and the cross members 207 with wheel pan 209 (supporting auto wheel 211) may be thought of, if desired, as a portion of an upper auto supporting deck.

The casing 18c has a pair of longitudinally spaced transverse plates or flanges 213 rigidly welded to it and these are reduced in width to provide shoulders 215 that rest on the top of leg 201 and projecting latch portions 217 that extend through apertures 219 in the leg 201. The portions 217 have aligned latch openings 221 in them below leg 201 to receive the latch bar or key 223, which, when received in said openings, will secure the casing 18c to the track 203 so that it cannot shift position or be inadvertently removed. A chain 225 of greater width than openings 221 is preferably secured at one end to key 223, the other end being affixed to the frame of the car, so that the key 223 won't be lost. The apertures 227 in the key will receive cross pins that co-operate with portions 217 and chain 223 to hold the key in the locking position of Fig. 12. Alternatively, hole 229 in a portion 217 will receive a safety wire that may loop around chain 225 to secure it in a position that will hold the key in locked position.

The tie-down 200 may also be chained to the frame of the car to avoid its misplacement. For this purpose, a chain 231 may be attached at one end to a loop 233 around cylinder 18c between plates 213. The other end of the chain 231 is attached to a loop 235 that slides on a bar 237, the opposite ends 233 of which are secured to a part of the car frame (as the wheel pan 209, for example). By making chain 231 or bar 237 of sufficient length the fitting can be readily moved to every operative position on track 203 and to a storage position, but it cannot be readily taken from the car.

A chain bearing block 239 in the form of a transverse cylinder is cut out and welded to the chain outlet end of casing 18c so that the center of the cylinder cross section coincides with the outside top corner 241 of the cylinder 18c. The block 239 is bored out as seen at 243 so that the chain bore 245 of casing 18c continues through it. The block 239 permits the chain 20 to be doubled back over the top of the casing 18c and because of its transverse width even provides bearing when the double back is coupled with angularity with respect to the axis of the tie-down 200.

From the foregoing it will be appreciated by those skilled in the art that the present invention provides a tie-down apparatus which enables the easy and efficient tying down of vehicles having a minimum of clearance between the vehicle tie-down bracket and the vehicle supporting deck; enables the disposing of the chain or other flexible tie-down element at the optimum inclination; positions the fine take-up actuating element for maximum accessibility and otherwise accomplishes the aforesaid objects.

This application is a continuation of our co-pending application, Serial No. 490,051, filed February 23, 1955, now abandoned.

What is claimed is:

1. Tie down apparatus for tying down a vehicle, said apparatus including a structure having a vehicle supporting surface, a tie-down rail secured to and extending parallel to said surface, a tie-down fitting adapted to tie a vehicle to said rail and including a casing having an interior bore, first co-operating means on said rail at a plurality of predetermined locations spaced longitudinally of said rail and holding said fitting disposed with said bore of said casing substantially parallel to said vehicle supporting surface at each of said predetermined locations, said first co-operating means providing a coarse adjustment of said tie-down apparatus relative to said tie-down rail, a draw member mounted in said bore and movable axially thereof, a flexible tie-down member connected to said draw member and adapted to be connected to a vehicle on said vehicle supporting surface, second co-operating means connecting said draw member to said casing for adjusting said draw member axially of said bore to provide a fine take-up of said tie-down apparatus.

2. Tie-down apparatus as defined in claim 1 wherein said flexible tie-down member is disposed at one end of said casing and said second co-operating means includes a screw member rotatably supported in the other end of said casing and effective upon rotation thereof to move said draw member axially of said bore, and means on said casing holding said screw member against movement axially of said bore.

3. Tie-down apparatus as defined in claim 2 wherein said draw member is disposed wholly within said bore and said flexible tie-down member is connected to said draw member within said bore and extends outwardly of said one end of said casing.

4. Tie-down apparatus as defined in claim 1 wherein said first co-operating means includes means on said rail defining a slotlike opening extending longitudinally thereof and inwardly facing shoulders at opposite sides thereof, attachment means on said fitting including laterally extending projections registering, when said fitting is secured to said rail, with said shoulders and preventing movement of said fitting transversely of said rail in a direction to move said attachment means outwardly through said slotlike opening.

5. Tie-down apparatus as defined in claim 1 wherein said first co-operating means includes means mounting said fitting on said rail for movement longitudinally thereof and holding said fitting disposed with said bore of said casing substantially parallel to said rail.

6. Tie-down apparatus as defined in claim 1 including means defining a recess below said vehicle supporting surface and supporting said rail within said recess and wherein said first named means supports said fitting on said rail with said casing disposed within said recess.

References Cited in the file of this patent

UNITED STATES PATENTS

| | | | |
|---|---|---|---|
| 1,816,897 | Fedderman et al. | Aug. 4, | 1931 |
| 2,024,444 | Friedlaender | Dec. 17, | 1935 |
| 2,120,497 | Heinrich | June 14, | 1938 |
| 2,205,273 | Radey | June 18, | 1940 |
| 2,688,504 | Parker | Sept. 7, | 1954 |
| 2,715,012 | Huber | Aug. 9, | 1955 |
| 2,743,684 | Elsner | May 1, | 1956 |